United States Patent
Singhai et al.

(10) Patent No.: US 10,979,161 B2
(45) Date of Patent: Apr. 13, 2021

(54) METHOD AND APPARATUS TO ENABLE FAST CHANNEL SWITCHING WITH LIMITED DVB RECEIVER MEMORY

(71) Applicant: QUALCOMM Incorporated, San Diego, CA (US)

(72) Inventors: Sandeep Singhai, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 16/396,051

(22) Filed: Apr. 26, 2019

(65) Prior Publication Data

US 2019/0253164 A1    Aug. 15, 2019

Related U.S. Application Data

(62) Division of application No. 12/212,375, filed on Sep. 17, 2008, now Pat. No. 10,320,500.

(Continued)

(51) Int. Cl.
*H04H 20/26* (2008.01)
*H04H 20/42* (2008.01)
(Continued)

(52) U.S. Cl.
CPC ............ *H04H 20/26* (2013.01); *H04H 20/42* (2013.01); *H04N 7/17318* (2013.01);
(Continued)

(58) Field of Classification Search
CPC ...... H04H 20/26; H04H 20/42; H04N 21/426; H04N 7/17318; H04N 21/42692;
(Continued)

(56) References Cited

U.S. PATENT DOCUMENTS 6,985,188 B1    1/2006 Hurst, Jr.
2001/0040891 A1    11/2001 Hasegawa et al.
(Continued)

FOREIGN PATENT DOCUMENTS

CN    1799211 A    7/2006
EP    1657835 A1    5/2006
(Continued)

OTHER PUBLICATIONS

Dorot V., et al., "An Explanatory Dictionary of Modern Computer Terms," 2nd Edition, 2001, 'Program Product' on p. 339, BHV—Petersburg Publishers, Saint Petersburg.
(Continued)

*Primary Examiner* — Michael R Telan
(74) *Attorney, Agent, or Firm* — Campbell C. Chiang; Austin Rapp (57) ABSTRACT

An apparatus and method for channel switching comprising encapsulating a plurality of IP datagrams associated with a plurality of real time audio/visual (A/V) streams or a plurality of file objects onto a plurality of MPE sections; inserting the plurality of MPE sections into one of a plurality of elementary streams; and multiplexing the plurality of elementary streams associated with the plurality of real time A/V streams or the plurality of file objects into a plurality of non-consecutive bursts, wherein the plurality of elementary streams are adjacent in a channel line-up. In one aspect, the plurality of non-consecutive bursts is transmitted to a DVB-H receiver with a limited memory size for enabling fast channel switching. In one aspect, the channel line-up is presented in an electronic service guide (ESG).

15 Claims, 9 Drawing Sheets

Related U.S. Application Data (60) Provisional application No. 60/973,419, filed on Sep. 18, 2007.

(51) Int. Cl.
    *H04N 7/173*         (2011.01)
    *H04N 21/426*      (2011.01)
    *H04N 21/438*      (2011.01)
    *H04N 21/61*       (2011.01)
    *H04N 21/643*      (2011.01)
    *H04N 21/6547*    (2011.01)

(52) U.S. Cl.
CPC ..... *H04N 21/426* (2013.01); *H04N 21/42692* (2013.01); *H04N 21/4384* (2013.01); *H04N 21/6131* (2013.01); *H04N 21/64315* (2013.01); *H04N 21/6547* (2013.01)

(58) Field of Classification Search
CPC ........... H04N 21/4384; H04N 21/6131; H04N 21/64315; H04N 21/6547
See application file for complete search history.

(56) References Cited

U.S. PATENT DOCUMENTS

| | | | |
|---|---|---|---|
| 2006/0053450 A1* | 3/2006 | Saarikivi | H04N 21/26283 725/46 |
| 2006/0277577 A1 | 12/2006 | Kiiskinen et al. | |
| 2007/0014381 A1 | 1/2007 | Rozenblit et al. | |
| 2007/0014654 A1 | 1/2007 | Haverfield et al. | |
| 2007/0027720 A1 | 2/2007 | Hasan et al. | |
| 2007/0121629 A1 | 5/2007 | Cuijpers et al. | |
| 2007/0143810 A1* | 6/2007 | Yousef | H04N 5/4401 725/120 |
| 2007/0146542 A1* | 6/2007 | Strasser | H04N 21/4305 348/462 |
| 2007/0153914 A1* | 7/2007 | Hannuksela | H04N 21/4384 375/240.26 |
| 2007/0277209 A1 | 11/2007 | Yousef | |
| 2008/0076778 A1 | 3/2008 | Ossovskaya et al. | |
| 2009/0019508 A1 | 1/2009 | Oren | |
| 2009/0077585 A1 | 3/2009 | Singhai et al. | |
| 2009/0168902 A1 | 7/2009 | Kisoda et al. | |

FOREIGN PATENT DOCUMENTS

| | | |
|---|---|---|
| RU | 2140133 C1 | 10/1999 |
| RU | 2219671 C2 | 12/2003 |
| WO | 9533329 A2 | 12/1995 |
| WO | 0174012 A1 | 10/2001 |
| WO | 2006031925 | 3/2006 |
| WO | 2006114830 A1 | 11/2006 |
| WO | 2006123231 A1 | 11/2006 |
| WO | 07024268 A1 | 3/2007 |

OTHER PUBLICATIONS

ETSI: "DVB-H Implementation Guidelines DVB BlueBook document A092 Rev. 2, May 2007", XP002535421.

International Search Report and Written Opinion—PCT/US2008/076778, International Search Authority—European Patent Office—dated Jul. 29, 2009.

Joki H., "Modeling of DVB-H Link Layer", Department of Information Technology University of Turku, May 10, 2005, retrieved from Internet: www.netlab.hut.fi/opetus/s38310/04-05/Kalvot_04-05/Joki_100505.ppt DVB-H Implementation Guidelines DVB BlueBook document A092 Rev.2, May 2007, pp. 1-35.

Taiwan Search Report—TW101142942—TIPO—dated Jul. 10, 2013.

\* cited by examiner

FIG.11

METHOD AND APPARATUS TO ENABLE FAST CHANNEL SWITCHING WITH LIMITED DVB RECEIVER MEMORY

CLAIM OF PRIORITY

This application is a divisional of U.S. patent application Ser. No. 12/212,375, filed Sep. 17, 2008, for "METHOD AND APPARATUS TO ENABLE FAST CHANNEL SWITCHING WITH LIMITED DVB RECEIVER MEMORY," which claims priority to U.S. Provisional Patent Application Ser. No. 60/973,419, filed Sep. 18, 2007, for "FAST CHANNEL SWITCHING ON MEMORY CONSTRAINED RECEIVERS," all of which are assigned to the assignee hereof and hereby expressly incorporated by reference herein.

FIELD

This disclosure relates generally to apparatus and methods for enabling fast channel switching. More particularly, the disclosure relates to enabling fast channel switching with limited DVB receiver memory.

BACKGROUND

Digital Video Broadcasting (DVB) is a family of standards for digital television applications. DVB includes both source coding (e.g., reduction of source data rate) and channel coding (e.g., improvement in transmission resiliency) methods for efficient and robust digital transmission of audiovisual information, for example, digital television. Different versions of DVB have been developed to address particular communication delivery modes. For example, DVB-S is designed for satellite broadcasting of digital TV, DVB-T is designed for terrestrial broadcasting of digital TV and DVB-C is designed for cable broadcasting of digital TV. A more recent version, digital video broadcasting-handheld (DVB-H), has been developed for mobile digital TV applications to handheld devices such as mobile telephones and personal digital assistants (PDAs).

All of the versions of DVB incorporate source coding based on the Moving Pictures Experts Group (MPEG) digital compression standards. Digital compression is a well-known digital signal processing method to reduce the source data rate by accounting for information redundancy and by coding mostly differential information, rather than only absolute information.

At any one time, multiple stream bursts of information (e.g., digital TV, file/data downloads, data multicast, etc.) may be received by a DVB-H receiver. Typically, the average channel switching time is half the time slice period which may be too long for typical user satisfaction. Although with additional memory DVB-H receivers can achieve faster channel switching, increasing the memory size in handheld receivers increases the cost and dc power consumption, which is in many instances is not acceptable for small battery-powered mobile devices.

SUMMARY

Disclosed is an apparatus and method for enabling channel switching, for example, for enabling fast channel switching with limited DVB receiver memory. According to one aspect, a method for channel switching comprising encapsulating a plurality of IP datagrams associated with a plurality of real time audio/visual (A/V) streams or a plurality of file objects onto a plurality of MPE sections; inserting the plurality of MPE sections into one of a plurality of elementary streams; and multiplexing the plurality of elementary streams associated with the plurality of real time A/V streams or the plurality of file objects into a plurality of non-consecutive bursts, wherein the plurality of elementary streams are adjacent in a channel line-up. In one aspect, the plurality of non-consecutive bursts is transmitted to a receiver with a limited memory size for enabling channel switching. In one example, the receiver is a DVB-H receiver. In one aspect, the channel line-up is presented on an electronic service guide (ESG), and the non-consecutive bursts are in a multiplexed order of skipping at least one real time A/V stream of the plurality of real time A/V streams that are consecutively presented on the ESG.

According to another aspect, a transmitting device comprising a processor and a memory, the memory containing program code executable by the processor for performing the following: encapsulating a plurality of IP datagrams associated with a plurality of real time audio/visual (A/V) streams or a plurality of file objects onto a plurality of MPE sections; inserting the plurality of MPE sections into one of a plurality of elementary streams; and multiplexing the plurality of elementary streams associated with the plurality of real time A/V streams or the plurality of file objects into a plurality of non-consecutive bursts, wherein the plurality of elementary streams are adjacent in a channel line-up. In one aspect, the memory further comprising program code for transmitting the plurality of non-consecutive bursts to a receiver with a limited memory size for enabling channel switching. In one aspect, the channel line-up is presented on an electronic service guide (ESG), and the non-consecutive bursts are in a multiplexed order of skipping at least one real time A/V stream of the plurality of real time A/V streams that are consecutively presented on the ESG.

According to another aspect, a device for enabling a receiver to optimize channel switching time comprising means for encapsulating a plurality of IP datagrams associated with a plurality of real time audio/visual (A/V) streams or a plurality of file objects onto a plurality of MPE sections; means for inserting the plurality of MPE sections into one of a plurality of elementary streams; and means for multiplexing the plurality of elementary streams associated with the plurality of real time A/V streams or the plurality of file objects into a plurality of non-consecutive bursts, wherein the plurality of elementary streams are adjacent in a channel line-up. In one aspect, the TV channel line-up is presented on an electronic service guide (ESG), and wherein the non-consecutive bursts are in a multiplexed order of skipping at least one real time A/V stream of the plurality of real time A/V streams that are consecutively presented on the ESG.

According to another aspect, a computer program product, comprising a computer-readable medium including program codes stored thereon, comprising program codes for causing a computer to encapsulate a plurality of IP datagrams associated with a plurality of real time audio/visual (A/V) streams or a plurality of file objects onto a plurality of MPE sections; program codes for causing the computer to insert the plurality of MPE sections into one of a plurality of elementary streams; and program codes for causing the computer to multiplex the plurality of elementary streams associated with the plurality of real time A/V streams or the plurality of file objects into a plurality of non-consecutive bursts, wherein the plurality of elementary streams are adjacent in a channel line-up.

According to another aspect, a method for a receiver to optimize channel switching time comprising selecting a real time audio/visual (A/V) stream n from a plurality of real time A/V streams from a channel line-up; demultiplexing a plurality of elementary streams (ES) to obtain real time A/V streams (n−1), n and (n+1) from the plurality of real time A/V streams, wherein the real time A/V streams (n−1), n and (n+1) are consecutive in the channel line-up; decoding the real time A/V stream n to obtain decoded data; and discarding the real time A/V streams (n−1) and (n+1).

According to another aspect, a receiver for optimize channel switching time comprising means for selecting a real time audio/visual (A/V) stream n from a plurality of real time A/V streams from a channel line-up; means for demultiplexing a plurality of elementary streams (ES) to obtain real time A/V streams (n−1), n and (n+1) from the plurality of real time A/V streams, wherein the real time A/V streams (n−1), n and (n+1) are consecutive in the channel line-up; means for decoding the real time A/V stream n to obtain decoded data; and means for discarding the real time A/V streams (n−1) and (n+1).

According to another aspect, a computer program product, comprising a computer-readable medium including program codes stored thereon, comprising program codes for causing a computer to select a real time audio/visual (A/V) stream n from a plurality of real time A/V streams from a channel line-up; program codes for causing the computer to demultiplex a plurality of elementary streams (ES) to obtain real time A/V streams (n−1), n and (n+1) from the plurality of real time A/V streams, wherein the real time A/V streams (n−1), n and (n+1) are consecutive in the channel line-up; program codes for causing the computer to decode the real time A/V stream n to obtain decoded data; and program codes for causing the computer to discard the real time A/V streams (n−1) and (n+1).

According to another aspect, a method for a receiver to optimize channel switching time comprising selecting a file object n from a plurality of file objects from a channel line-up; demultiplexing a plurality of elementary streams (ES) to obtain file objects (n−1), n and (n+1) from the plurality of file objects, wherein the file objects (n−1), n and (n+1) are consecutive in the channel line-up; decoding the file object n to obtain decoded data; and discarding the file objects (n−1) and (n+1).

According to another aspect, a receiver for optimize channel switching time comprising means for selecting a file object n from a plurality of file objects from a channel line-up; means for demultiplexing a plurality of elementary streams (ES) to obtain file objects (n−1), n and (n+1) from the plurality of file objects, wherein the file objects (n−1), n and (n+1) are consecutive in the channel line-up; means for decoding the file object n to obtain decoded data; and means for discarding the file objects (n−1) and (n+1).

According to another aspect, a computer program product, comprising a computer-readable medium including program codes stored thereon, comprising program codes for causing a computer to select a file object n from a plurality of file objects from a channel line-up; program codes for causing the computer to demultiplex a plurality of elementary streams (ES) to obtain file objects (n−1), n and (n+1) from the plurality of file objects, wherein the file objects (n−1), n and (n+1) are consecutive in the channel line-up; program codes for causing the computer to decode the file object n to obtain decoded data; and program codes for causing the computer to discard the file objects (n−1) and (n+1).

One advantage of the present disclosure includes the ability for fast channel switching between simultaneous multiple stream bursts of information while using a DVB-H receiver with limited memory. The present disclosure reduces the time duration of channel switching and makes the channel switching time independent of the time slice period. Other advantages include maintaining the memory size and thus maintaining the cost of the DVB-H receiver. The advantages in turn enhance user experience.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

DVB-H specifies several network protocol layers for mobile TV applications. The DVB-H physical layer is based on the DVB-T physical layer, with some minor additions. The DVB-H physical layer employs orthogonal frequency division multiplexing (OFDM) multi-carrier modulation. The data link layer is based on the MPEG2 transport stream (TS), as defined in ITU-T H.222.0, which is formed by multiplexing the real time encoded video and audio streams along with certain overhead data and signaling information such as the Program Specific Information/System Information (PSI/SI).

An enhanced error-protection technique in the data link layer is also used to obtain reliable transmission despite propagation impairments. This technique is known as Multi-Protocol Encapsulation-Forward Error Correction (MPE-FEC) which provides additional channel coding beyond the DVB-T channel coding and time interleaving at the physical layer. MPE-FEC, for example, employs a (255,191) block Reed-Solomon error correction code to improve the received signal robustness in mobility conditions. MPE-FEC may be able to correct errors which are otherwise uncorrectable by the physical layer error correction mechanism. MPE is used to encapsulate IP datagrams within MPEG TS structures known as sections. The IP datagrams encapsulated within these MPE sections may contain real-time audiovisual streaming data or file objects. In addition, a power-saving technique known as time slicing is introduced in DVB-H. Each individual service in a DVB-H transmission is sent in bursts which allows the receiver to go into sleep mode and to wake up only for reception of its intended service.

The network and transport layers utilize the Internet Protocol (IP) and User Datagram Protocol (UDP). In contrast to other DVB transmission systems, the DVB-H system employs IP to facilitate interoperability with other IP-based networks. The transport layer also includes Real-time Transport Protocol/Real-time Transport Control Protocol (RTP/RTCP) for audio-visual (A/V) streaming, and asynchronous layered coding/layered coding transport (ALC/LCT) and file delivery over unidirectional transport (FLUTE) for file object delivery. FLUTE can be used to deliver file objects of any type. Typical usage of FLUTE includes delivery of extensible markup language (XML) fragments/files and session description protocol (SDP) carrying program information and delivery of media file objects such as A/V files, pictures, logos etc. Real time video and audio streams are carried by Real-time Transport Protocol (RTP) over UDP over IP packets which are embedded into the MPEG transport stream using the Multi-Protocol Encapsulation (MPE) adaptation protocol.

Figure 1:
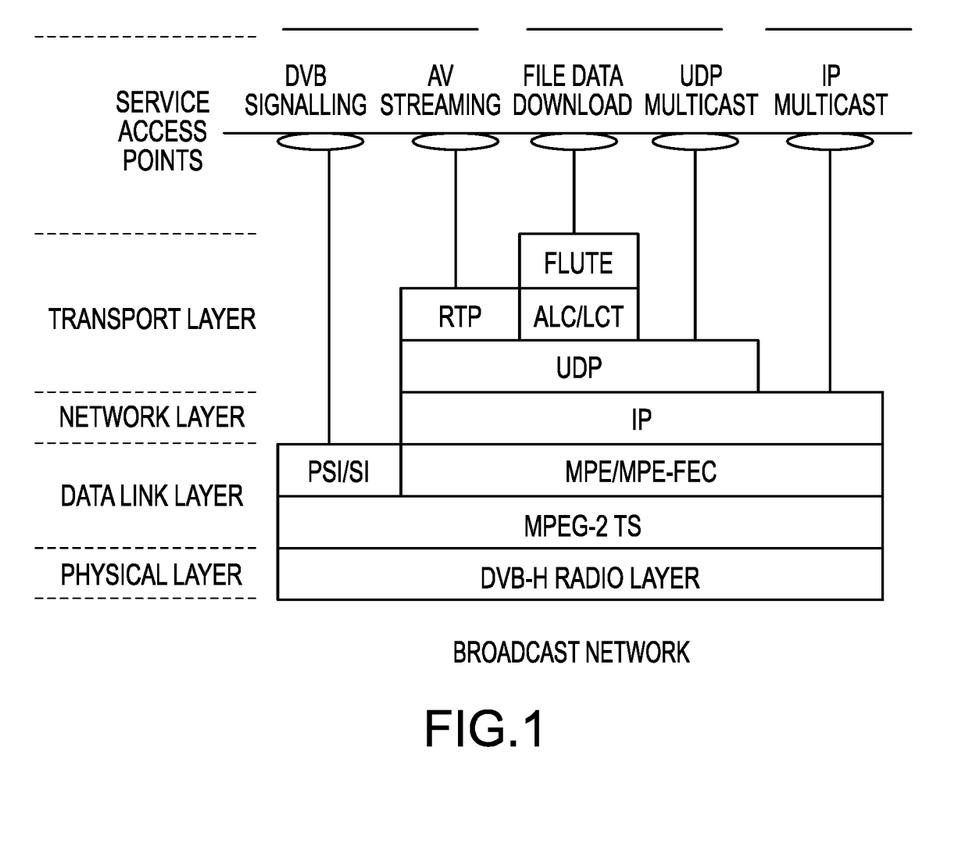
FIG. 1 illustrates an example of how various user services, including DVB signaling, audio-visual streaming, file downloading, UDP multicasting, and IP multicasting, are carried by the DVB-H protocol stack.

FIG. 1 illustrates an example of how various user services, including DVB signaling, audio-visual streaming, file downloading, UDP multicasting, and IP multicasting, are carried by the DVB-H protocol stack. As illustrated, all user services are embedded into the MPEG2 transport stream over the DVB-H physical layer. The Program Specific Information (PSI) provides information regarding the programs (media/content) being transmitted in the MPEG2 transport stream and location information (e.g. link layer identifiers) to extract these programs from the multiplexed stream. The System Information (SI) provides network information, for example, the transmit frequencies of transport streams from a certain network, the location (transport stream, service identifiers) of certain transmitted program/IP streams, etc.

Figure 2:
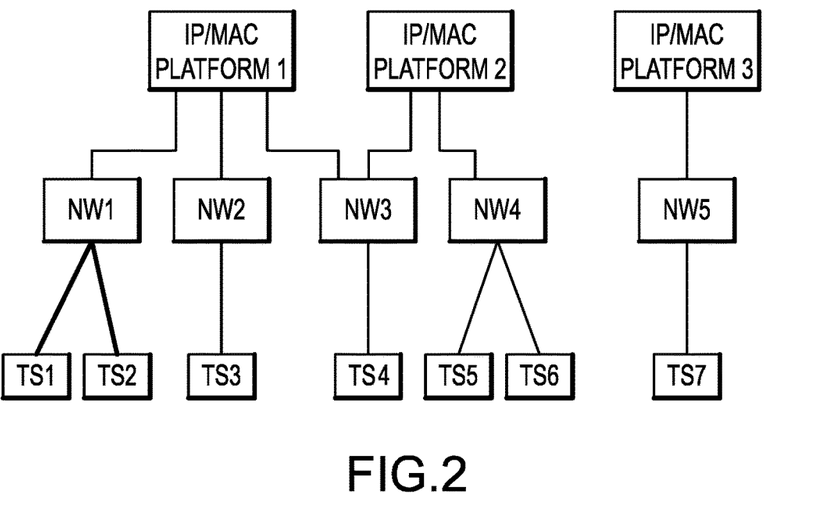
FIG. 2 illustrates an example of a DVB-H network hierarchy.

The DVB-H system may consist of one or more IP/media access control (MAC) platforms. The IP/MAC platform represents a harmonized IP/MAC address space, without any address conflicts. An IP/MAC platform may span several transport streams within one or multiple networks. Conversely, a transport stream or network may contain more than one IP/MAC platform. FIG. 2 illustrates an example of a DVB-H network hierarchy.

The application layer includes any applications that can take advantage of RTP/RTCP and IP multicast. Some typical applications for mobile broadcast include: Media Player for playback of real time A/V programming, media file objects; Electronic Service Guide (ESG) browser application which utilizes the XML program guide information received over FLUTE; gaming/interactivity applications based on broadcast/multicast framework, etc.

Figure 3:
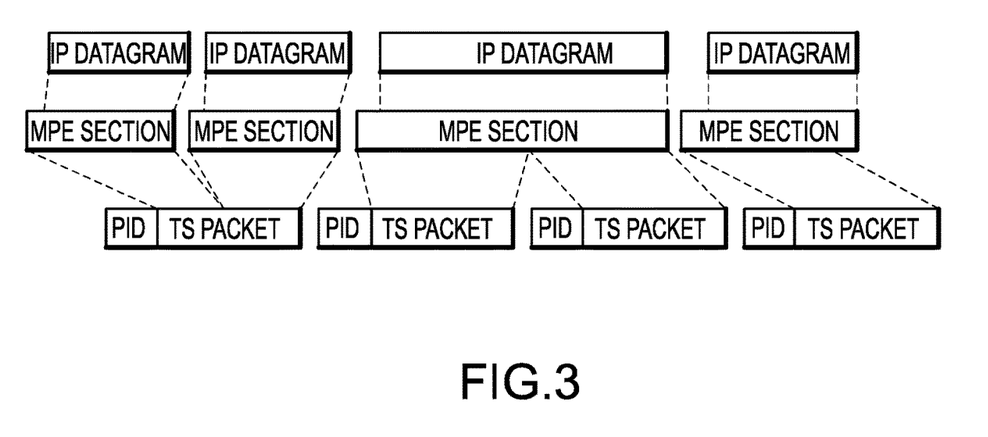
FIG. 3 illustrates an example of a protocol layer decomposition.

Each program, defined as a real time A/V stream or a FLUTE session carrying a specific set/type of objects, is part of an elementary stream (ES). Each ES may carry one or more such programs. Each elementary stream consists of or includes encapsulated IP datagrams (MPE sections) which belong to these programs. MPE sections are in turn transmitted in fixed length (188 byte). MPEG2 transport stream packets with a packet identifier (PID) that is specific to this ES. FIG. 3 illustrates an example of a protocol layer decomposition.

In DVB-H, Multi-Protocol Encapsulation-Forward Error Correction (MPE-FEC) frames (consisting of MPE sections and corresponding FEC sections) belonging to an Elementary Stream are transmitted as bursts of 512 kbits, 1024 kbits, 1536 kbits or 2048 kbits of data. These bursts of data are transmitted at a bit rate much higher than the average bit rate of a program within the elementary stream. This allows program data to be transmitted in a time-sliced manner.

Figure 4:
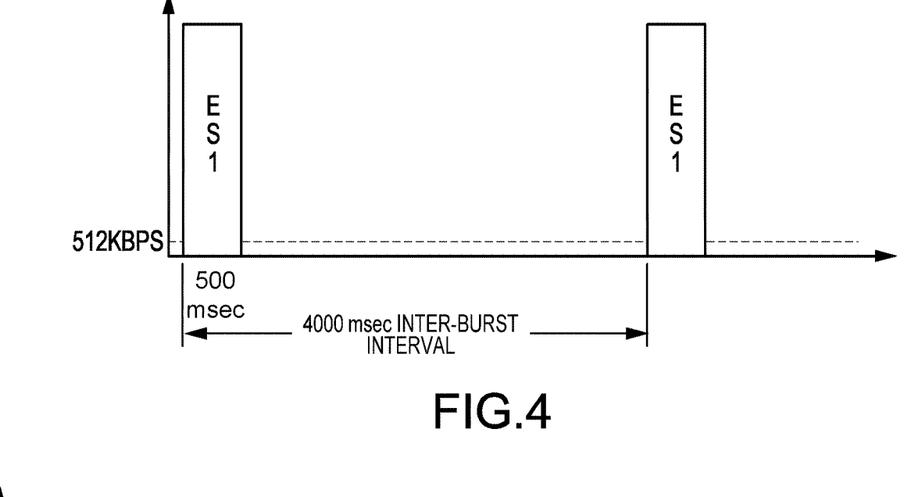
FIG. 4 illustrates an example transmission timeline for one elementary stream over a 4 second burst interval.
Figure 5:
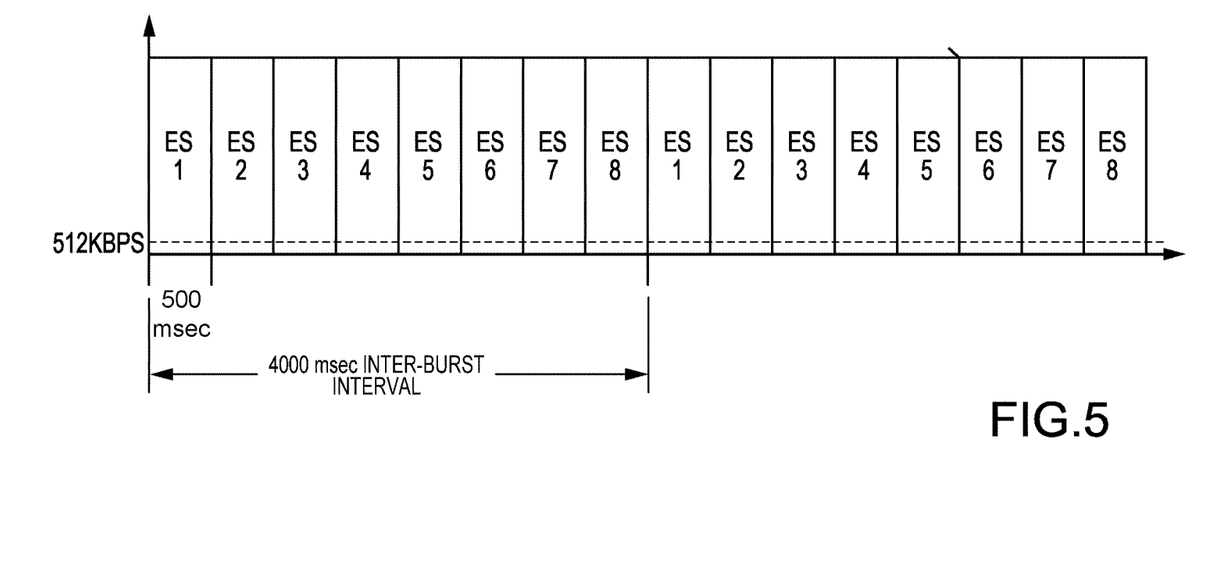
FIG. 5 illustrates an example transmission timeline for 8 different elementary streams over a 4 second burst interval.

In one aspect, an elementary stream (ES) consists of or includes just one program, for example, an A/V stream with an average bit rate of 512 kbps. Assuming that a burst size of 2048 kbits is used to transmit this ES, four seconds worth of data can be transmitted in this burst. If the burst was transmitted at 4 Mbps, the burst can be transmitted within 500 msec. The transmitter only has to transmit a burst of 500 msec duration once every four seconds for this program. Conversely, the receiver (e.g., DVB-H receiver) only has to receive a burst once every four seconds for 500 msec. If the transmitter used the same burst size and burst bandwidth for all elementary streams, it could transmit 8 separate elementary stream bursts, before repeating a burst. FIG. 4 illustrates an example transmission timeline for one elementary stream over a 4 second burst interval. FIG. 5 illustrates an example transmission timeline for 8 different elementary streams over a 4 second burst interval.

In one aspect, the DVB-H receiver wakes up only for the duration when the ES of interest is being transmitted. Each MPE section in a burst carries the relative time offset to the start of the next burst for the elementary stream, thus allowing the DVB-H receiver to compute when to wake up next to receive a burst of the same ES. This allows the DVB-H receiver to shut off RF front end and baseband processing for a majority of the time, thus saving power.

In one aspect, the DVB-H the bursts are 512, 1024, 1536 or 2048 kbits in size. The bursts carry application data, i.e., IP datagrams as well as Reed-Solomon FEC data. When a burst is received, the DVB-H receiver buffers the burst in its memory for Reed-Solomon error correction. Hence, the DVB-H receiver needs a memory size that can accommodate the largest burst size. In the example herein the memory size is at least 2048 kbits of memory for each 2048 kbit data block from an elementary stream that the DVB-H receiver needs to process simultaneously.

Figure 6:
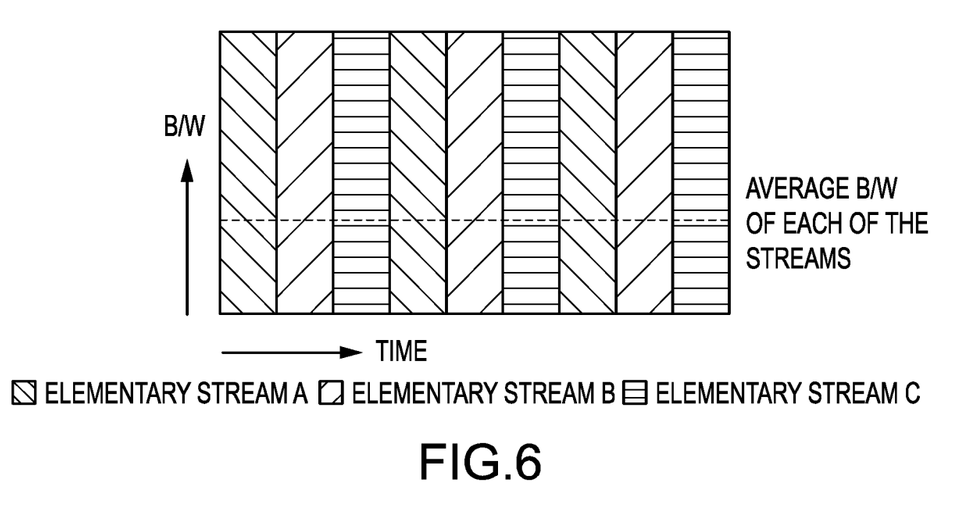
FIG. 6 illustrates an example burst transmission graph for elementary streams A, B and C.

However, if any two consecutive bursts $b_1$ and $b_2$ belonging to two different elementary streams are spaced apart in time such that the receiver has sufficient time to perform FEC processing and to drain the buffer for $b_1$ before $b_2$ arrives, a receiver can process both the elementary streams at essentially the same time with only, for example, 2048 kbits of memory size. FIG. 6 illustrates an example burst transmission graph for elementary streams A, B and C. In the example shown in FIG. 6, a DVB-H receiver with a limited memory (e.g., 2048 kbit in size) can process elementary streams A and C simultaneously as long as their bursts are sufficiently spaced apart such as to allow the FEC processing and burst buffer drainage before arrival of the next burst of interest. In one aspect, the DVB-H receiver can handle any number of elementary streams as long as any two bursts to be processed, i.e., bursts belonging to elementary streams being handled virtually simultaneously, are sufficiently spaced apart in time.

Typically, the audio/video services (e.g., TV channels) have a one to one mapping to an elementary stream. One common preference or requirement by a user is the ability to switch to the next or previous TV channel quickly, i.e., to channel surf. In one example, the TV channels are in the order as presented in the "TV Guide."

Figure 7:
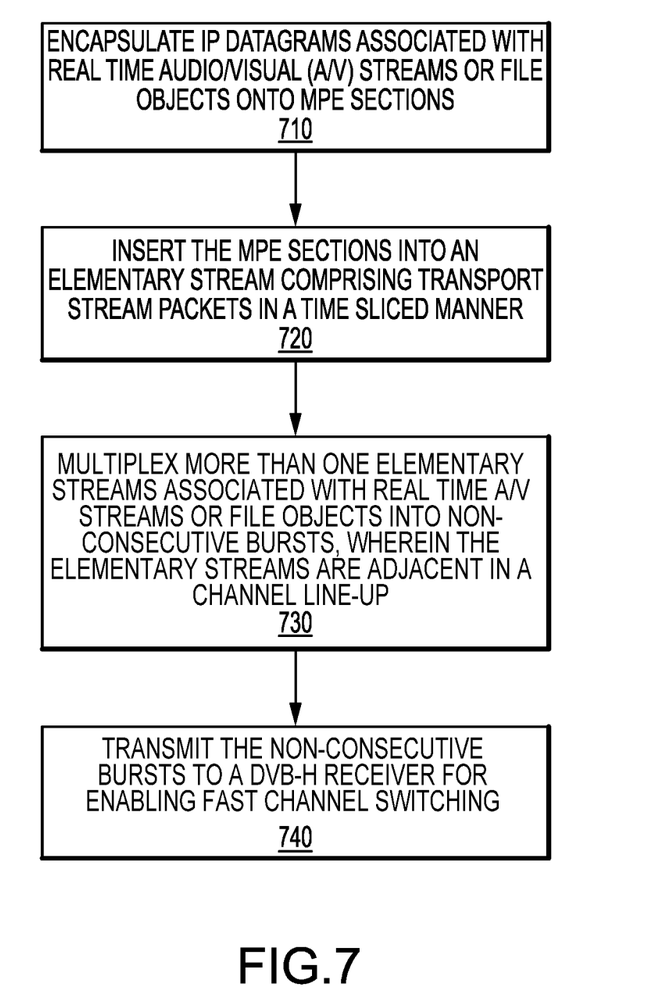
FIG. 7 illustrates an example flow diagram for a transmitting device to enable a receiver (e.g., DVB-H receiver) to optimize the channel switching time with a limited memory size.

FIG. 7 illustrates an example flow diagram for a transmitting device to enable a receiver (e.g., DVB-H receiver) to optimize the channel switching time with a limited memory size. In one example, the memory size is 2048 kbits. In block 710, encapsulate a plurality of IP datagrams associated with a plurality of real time audio/visual (A/V) streams or file objects onto a plurality of MPE sections. In one aspect, at least one of the plurality of MPE sections includes at least one forward error correction (FEC) section. In one aspect, the at least one FEC section is based on Reed-Solomon encoding. Examples of A/V streams include digital TV programs, digitally encoded movies, etc. Examples of file objects include XML fragments, data files, program information, audio-visual files, pictures, logos, gaming/interactivity applications, etc. One skilled in the art would understand that the examples of A/V streams and file objects disclosed herein are not meant to be exclusive, and that other examples may be included without affecting the scope or spirit of the present disclosure.

Following block 710, in block 720, insert the plurality of MPE sections into one of a plurality of elementary streams, wherein each of the plurality of elementary streams comprises a plurality of transport stream packets in a time sliced manner. Examples of the plurality of transport stream packets include fixed length packets, packets each with a fixed length of 188 bytes, packets associated with packet identifiers (PID), etc. One skilled in the art would understand that the examples of transport stream packets disclosed herein are not meant to be exclusive, and that other examples may be included without affecting the scope or spirit of the present disclosure. In one aspect, time sliced manner is characterized by a burst bit rate being much higher than an average bit rate of the A/V stream within the elementary stream.

Following block 720, in block 730, multiplex the plurality of elementary streams associated with the plurality of real time A/V streams or the plurality of file objects, wherein the plurality of elementary streams are adjacent in a channel line-up, into a plurality of non-consecutive bursts. In an example, transport stream packets within elementary streams are multiplexed in such a manner that the associated adjacent programs (i.e., A/V streams) in a TV channel line-up map to non-consecutive bursts. This enables the DVB-H receiver to process virtually simultaneously the non-consecutive bursts for adjacent programs. In one aspect, the TV channel line-up is presented in an electronic service guide (ESG), a.k.a. electronic program guide (EPG).

In one example, consecutive integers represent adjacent TV channels in the channel line-up. When a user selects program n for presentation, the DVB-H receiver also starts processing (e.g., demultiplexing) programs (n−1) and (n+1) at the same time. The data for program n are used for audio/video decoding while the data for programs (n−1) and (n+1) are discarded at the respective average rate of the elementary streams. In this example, as the user switches the TV channel selection to the previous channel or to the next channel (i.e., to programs (n−1) or (n+1)), the corresponding overhead data for the previous channel or the next channel will already be available.

In one example of A/V streams, assume a TV channel line-up consists of channels 1, 2, 3, 4, 5, 6, 7, 8, 9 and 10, and the first channel and the last channel are respectively channels 1 and 10. Assume that channels 1 and 10 are adjacent for the purposes of channel switching. If the bursts for different channels are placed in the following multiplexed order: 1, 4, 7, 10, 2, 5, 8, 3, 6 and 9, then any three consecutive channels can be processed by the receiver virtually simultaneously without requiring additional memory, enabling fast channel switching. In this example, the non-consecutive bursts are in a multiplexed order of skipping at least X real time A/V streams that are consecutively presented on the Electronic Service Guide, wherein X is two. One skilled in the art would understand that X can include other positive integer numbers, for example where X is at least one, based on the number of channels, application and design parameters without affecting the scope or spirit of the present disclosure.

Without multiplexing the elementary streams for adjacent TV channels into non consecutive bursts, the average channel switching time in DVB-H is a half time slice period. However, by multiplexing the elementary streams for adjacent TV channels into non consecutive bursts and by having the receiver demultiplex the requested channel as well as the channels adjacent to the requested channel, the channel switching time becomes independent of the time slice period and results in an almost instantaneous channel switching. One skilled in the art would appreciate that although the examples are illustrated in terms of a DVB-H receiver, that the concepts are applicable to any receiver with limited memory.

Following block 730, in block 740, transmit the plurality of non-consecutive bursts to a DVB-H receiver for enabling fast channel switching. In one aspect, the DVB-H receiver has a limited memory size. In one example, the limited memory size is 2048 kbits. One skilled in the art would appreciate that although the flow diagram in FIG. 7 is illustrated in association with a DVB-H receiver, the concepts are applicable to any receiver with limited memory size. One skilled in the art would also understand that the steps disclosed in the flow diagram of FIG. 7 may be modified according to application or system parameters, and other steps may be included without affecting the scope or spirit of the present disclosure. Furthermore, one skilled in the art would understand that some of the steps of the flow diagram illustrated in FIG. 7 may be interchanged in their order according to application or system parameters without affecting the scope or spirit of the present disclosure.

One skilled in the art would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

Figure 8:
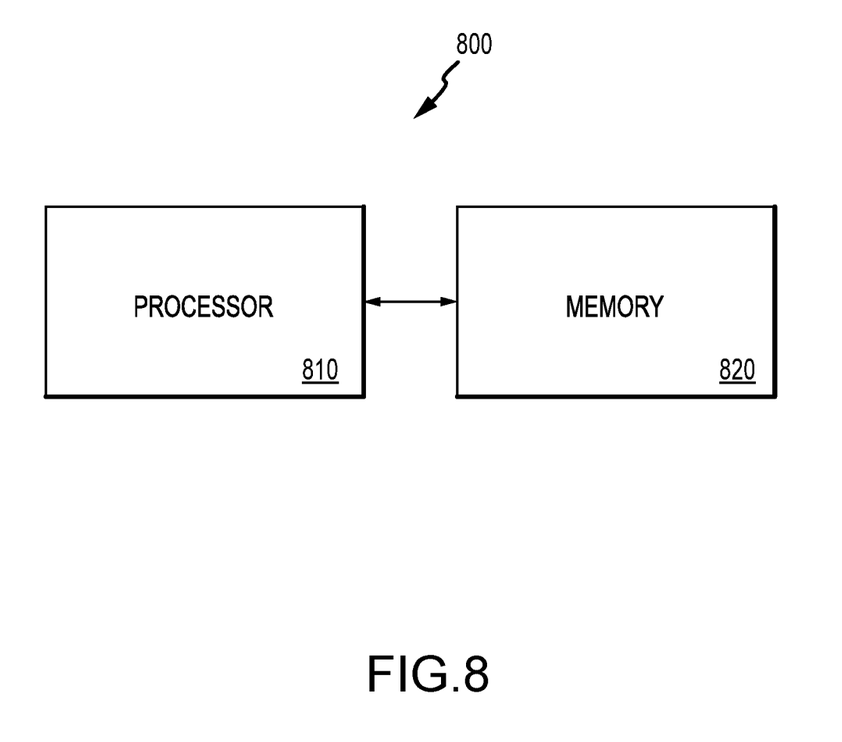
FIG. 8 illustrates an example of a transmitting device comprising a processor in communication with a memory of limited size for optimizing channel switching time.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a transmitting device 800 comprising a processor 810 in communication with a memory 820 for optimizing channel switching time. In one example, the transmitting device 800 is used to implement the algorithm illustrated in FIG. 7. In one aspect, the memory 820 is located within the processor 810. In another aspect, the memory 820 is external to the processor 810.

Figure 9:
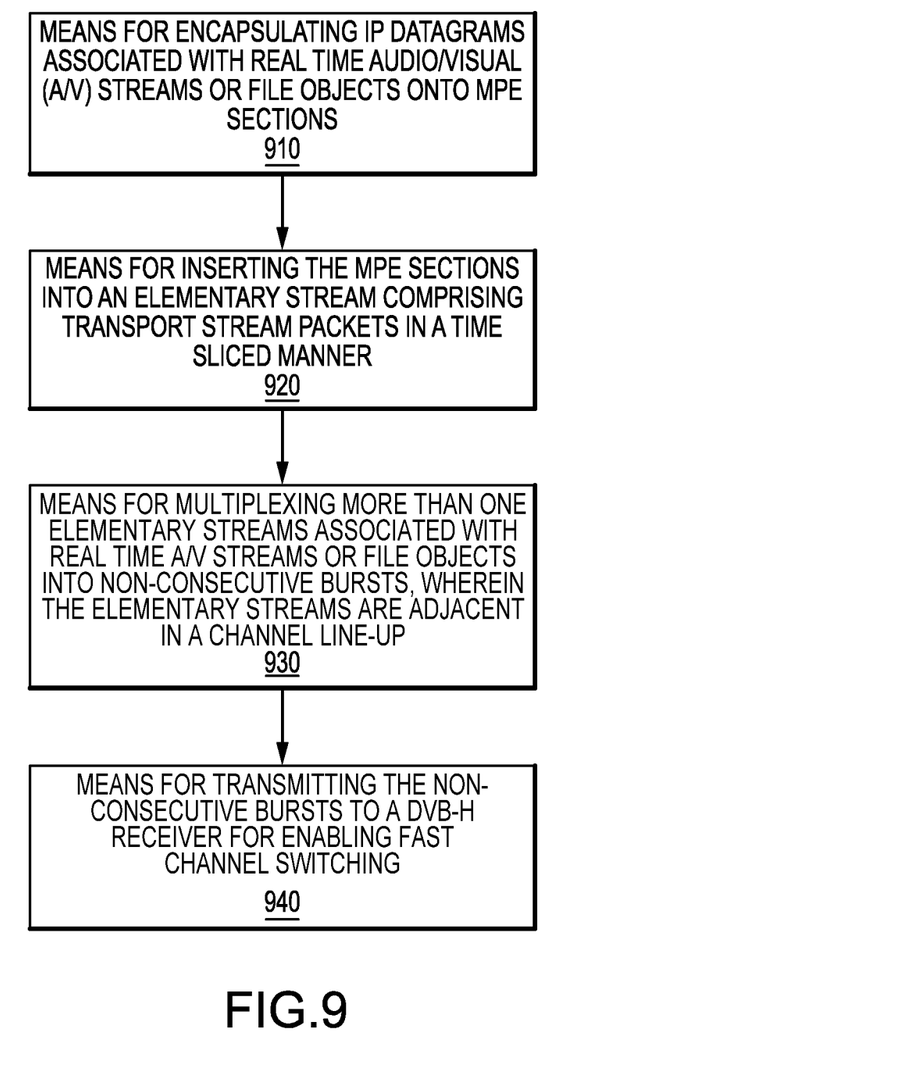
FIG. 9 illustrates an example of a transmitting device suitable for optimizing channel switching time.

FIG. 9 illustrates an example of a transmitting device 900 suitable for optimizing channel switching time. In one aspect, the transmitting device 900 is implemented by at least one processor comprising one or more modules configured to provide different aspects of fast channel switching as described herein in blocks 910, 920, 930 and 940. For example, each module comprises hardware, firmware, software, or any combination thereof. In one aspect, the transmitting device 900 is also implemented by at least one memory in communication with the at least one processor.

Figure 10:
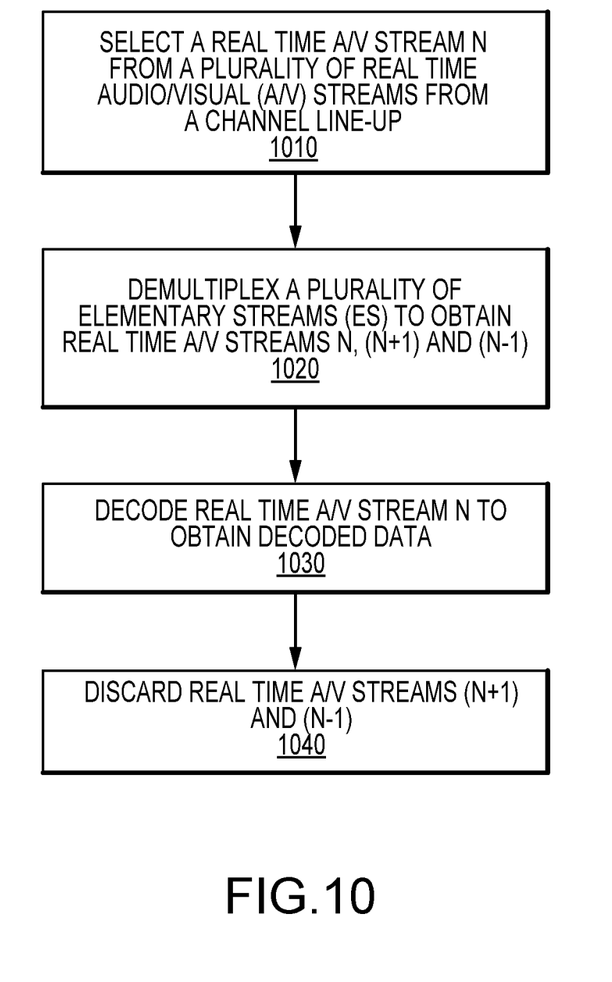
FIG. 10 illustrates an example flow diagram for a receiver with a limited memory size (e.g., DVB-H receiver) to optimize the channel switching time.

FIG. 10 illustrates an example flow diagram for a receiver with a limited memory size (e.g., DVB-H receiver) to optimize the channel switching time. In one aspect, the receiver has a limited memory size, for example, the memory size is 2048 kbits. In one aspect, the flow diagram illustrated in FIG. 10 for receiving is complimentary to the flow diagram illustrated in FIG. 7 for transmitting. In block 1010, select a real time audio/visual (A/V) stream n from a plurality of real time audio/visual (A/V) streams from a channel line-up, such as a TV channel line-up. The real time A/V stream n is also denoted as channel n. In one aspect, the TV channel line-up is presented in an electronic service guide (ESG). The plurality of real time A/V streams is associated with a plurality of elementary streams (ES).

Following block 1010, in block 1020, demultiplex a plurality of elementary streams (ES) to obtain real time A/V streams n, (n+1) and (n−1) (i.e., channels n, (n+1) and (n−1)) from the plurality of real time A/V streams. The real time A/V streams (n−1), n and (n+1) are consecutive in the channel line-up. Following block 1020, in block 1030, decode real time A/V stream n (i.e., channel n) to obtain decoded data. That is the data decoded from real time A/V stream n is to be presented to the user. In block 1040, discard real time A/V streams (n+1) and (n−1), i.e., discard channel (n+1) and channel (n−1). In one aspect, the real time A/V streams (n+1) and (n−1) are discarded at corresponding average rates. One skilled in the art would understand that block 1040 can be performed sequentially to block 1030 or in parallel without affecting the scope or spirit of the present disclosure. One skilled in the art would also understand that the steps disclosed in the flow diagram of FIG. 10 may be modified according to application or system parameters, and other steps may be included without affecting the scope or spirit of the present disclosure. Furthermore, one skilled in the art would understand that some of the steps of the flow diagram illustrated in FIG. 10 may be interchanged in their order according to application or system parameters without affecting the scope or spirit of the present disclosure.

Figure 11:
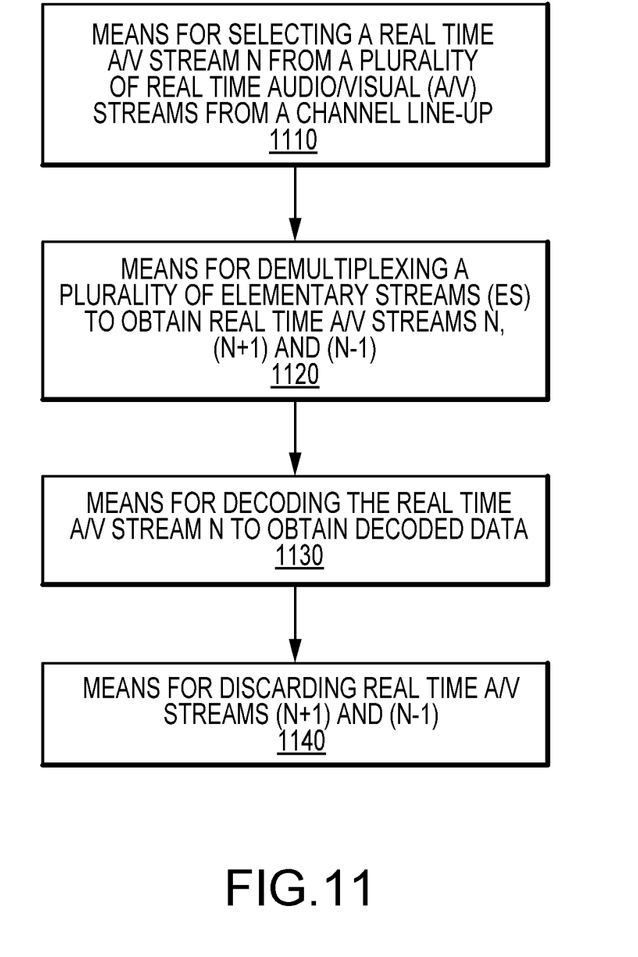
FIG. 11 illustrates an example of a receiving device with a limited memory size suitable for optimizing channel switching time.

FIG. 11 illustrates an example of a receiving device with a limited memory size suitable for optimizing channel switching time. In one aspect, the receiving device 1100 is implemented by at least one processor comprising one or more modules configured to provide different aspects of fast channel switching as described herein in blocks 1110, 1120, 1130 and 1140. For example, each module comprises hardware, firmware, software, or any combination thereof. In one aspect, the receiving device 1100 is also implemented by at least one memory in communication with the at least one processor. Although FIGS. 10 and 11 are illustrated using real time A/V streams, one skilled in the art would understand that file objects could be substituted for the real time A/V streams without affecting the scope or spirit of the present disclosure.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for a receiver to optimize channel switching time comprising:

selecting a real time audio/visual (A/V) stream n from a plurality of real time A/V streams from a channel line-up;

demultiplexing a plurality of elementary streams (ES) to obtain real time A/V streams (n−1), n and (n+1) from the plurality of real time A/V streams, wherein the real time A/V streams (n−1), n and (n+1) are consecutive in the channel line-up, wherein a first burst, a second burst and a third burst respectively correspond to the real time A/V streams (n−1), n and (n+1), wherein the first burst is a nearest burst of the A/V stream (n−1) to the second burst and the third burst is a nearest burst of the A/V stream (n+1) to the second burst, and wherein a first number of bursts between the first burst and the second burst is unequal to a second number of bursts between the second burst and the third burst;

decoding the real time A/V stream n to obtain decoded data; and discarding the real time A/V streams (n−1) and (n+1).

2. The method of claim 1 further comprising presenting the decoded data to a user.

3. The method of claim 2 wherein the channel line-up is presented in an electronic service guide (ESG).

4. A receiver for optimizing channel switching time comprising:

means for selecting a real time audio/visual (A/V) stream n from a plurality of real time A/V streams from a channel line-up;

means for demultiplexing a plurality of elementary streams (ES) to obtain real time A/V streams (n−1), n and (n+1) from the plurality of real time A/V streams, wherein the real time A/V streams (n−1), n and (n+1) are consecutive in the channel line-up, wherein a first burst, a second burst and a third burst respectively correspond to the real time A/V streams (n−1), n and (n+1), wherein the first burst is a nearest burst of the A/V stream (n−1) to the second burst and the third burst is a nearest burst of the A/V stream (n+1) to the second burst, and wherein a first number of bursts between the first burst and the second burst is unequal to a second number of bursts between the second burst and the third burst;

means for decoding the real time A/V stream n to obtain decoded data; and means for discarding the real time A/V streams (n−1) and (n+1).

5. The receiver of claim 4 further comprising means for presenting the decoded data to a user.

6. The receiver of claim 5 wherein the channel line-up is presented in an electronic service guide (ESG).

7. A computer program product, comprising a non-transitory computer-readable medium including program codes stored thereon, comprising:

program codes for causing a computer to select a real time audio/visual (A/V) stream n from a plurality of real time A/V streams from a channel line-up;

program codes for causing the computer to demultiplex a plurality of elementary streams (ES) to obtain real time A/V streams (n−1), n and (n+1) from the plurality of real time A/V streams, wherein the real time A/V streams (n−1), n and (n+1) are consecutive in the channel line-up, wherein a first burst, a second burst and a third burst respectively correspond to the real time A/V streams (n−1), n and (n+1), wherein the first burst is a nearest burst of the A/V stream (n−1) to the second burst and the third burst is a nearest burst of the A/V stream (n+1) to the second burst, and wherein a first number of bursts between the first burst and the second burst is unequal to a second number of bursts between the second burst and the third burst;

program codes for causing the computer to decode the real time A/V stream n to obtain decoded data; and program codes for causing the computer to discard the real time A/V streams (n−1) and (n+1).

8. The computer program product of claim 7 further comprising program codes for causing the computer to present the decoded data to a user.

9. The computer program product of claim 8 wherein the channel line-up is presented in an electronic service guide (ESG).

10. A method for a receiver to optimize channel switching time comprising:

selecting a file object n from a plurality of file objects from a channel line-up;

demultiplexing a plurality of elementary streams (ES) to obtain file objects (n−1), n and (n+1) from the plurality of file objects, wherein the file objects (n−1), n and (n+1) are consecutive in the channel line-up, wherein a first burst, a second burst and a third burst respectively correspond to the file objects (n−1), n and (n+1), wherein the first burst is a nearest burst of the file object (n−1) to the second burst and the third burst is a nearest burst of the file object (n+1) to the second burst, and wherein a first number of bursts between the first burst and the second burst is unequal to a second number of bursts between the second burst and the third burst;

decoding the file object n to obtain decoded data; and discarding the file objects (n−1) and (n+1).

11. The method of claim 10 further comprising presenting the decoded data to a user.

12. A receiver for optimizing channel switching time comprising:

means for selecting a file object n from a plurality of file objects from a channel line-up;

means for demultiplexing a plurality of elementary streams (ES) to obtain file objects (n−1), n and (n+1) from the plurality of file objects, wherein the file objects (n−1), n and (n+1) are consecutive in the channel line-up, wherein a first burst, a second burst and a third burst respectively correspond to the file objects (n−1), n and (n+1), wherein the first burst is a nearest burst of the file object (n−1) to the second burst and the third burst is a nearest burst of the file object (n+1) to the second burst, and wherein a first number of bursts between the first burst and the second burst is unequal to a second number of bursts between the second burst and the third burst;

means for decoding the file object n to obtain decoded data; and means for discarding the file objects (n−1) and (n+1).

13. The receiver of claim 12 further comprising means for presenting the decoded data to a user.

14. A computer program product, comprising a non-transitory computer-readable medium including program codes stored thereon, comprising:

program codes for causing a computer to select a file object n from a plurality of file objects from a channel line-up;

program codes for causing the computer to demultiplex a plurality of elementary streams (ES) to obtain file objects (n−1), n and (n+1) from the plurality of file objects, wherein the file objects (n−1), n and (n+1) are consecutive in the channel line-up, wherein a first burst, a second burst and a third burst respectively correspond to the file objects (n−1), n and (n+1), wherein the first burst is a nearest burst of the file object (n−1) to the second burst and the third burst is a nearest burst of the file object (n+1) to the second burst, and wherein a first number of bursts between the first burst and the second burst is unequal to a second number of bursts between the second burst and the third burst;

program codes for causing the computer to decode the file object n to obtain decoded data; and program codes for causing the computer to discard the file objects (n−1) and (n+1).

15. The computer program product of claim 14 further comprising program codes for causing the computer to present the decoded data to a user.

* * * * *